Dec. 21, 1965 J. W. REBEL 3,224,895

METHOD OF MANUFACTURING DISPLAY SCREENS FOR CATHODE-RAY TUBES

Filed June 8, 1961

INVENTOR
JOHANNES W. REBEL
BY
Frank R. Jerifani
AGENT 3,224,895

METHOD OF MANUFACTURING DISPLAY SCREENS FOR CATHODE-RAY TUBES

Johannes Willem Rebel, Eindhoven, Netherlands, assignor to North American Philips Company, Inc., New York, N.Y., a corporation of Delaware Filed June 8, 1961, Ser. No. 115,773
Claims priority, application Netherlands, Aug. 6, 1960, 254,650
5 Claims. (Cl. 117—33.5)

The invention relates to a method of manufacturing display screens for cathode-ray tubes comprising at least two substances which are applied in discrete surfaces to a transparent support, and, when excited by electrons, luminesce emitting light of different colours. The invention also relates to cathode-ray tubes for displaying coloured images provided with a display screen manufactured by such a method.

Several methods of manufacturing display screens of the above-mentioned kind are known, in which the luminescent substances emitting light of different colours are applied in succession by means of a number of operations which are repeated for each substance. It has, for example, been proposed to apply the substances by printing processes, for example silk screen printing. Other methods which recently have been widely used, utilize a photosensitive binder, that is to say, a substance which after exposure to so-called "hardening radiation" is no longer soluble in a certain solvent. One of these methods will briefly be described hereinafter.

The invention will now be described with reference to the accompanying drawing, in which.

Figures 1, 2:
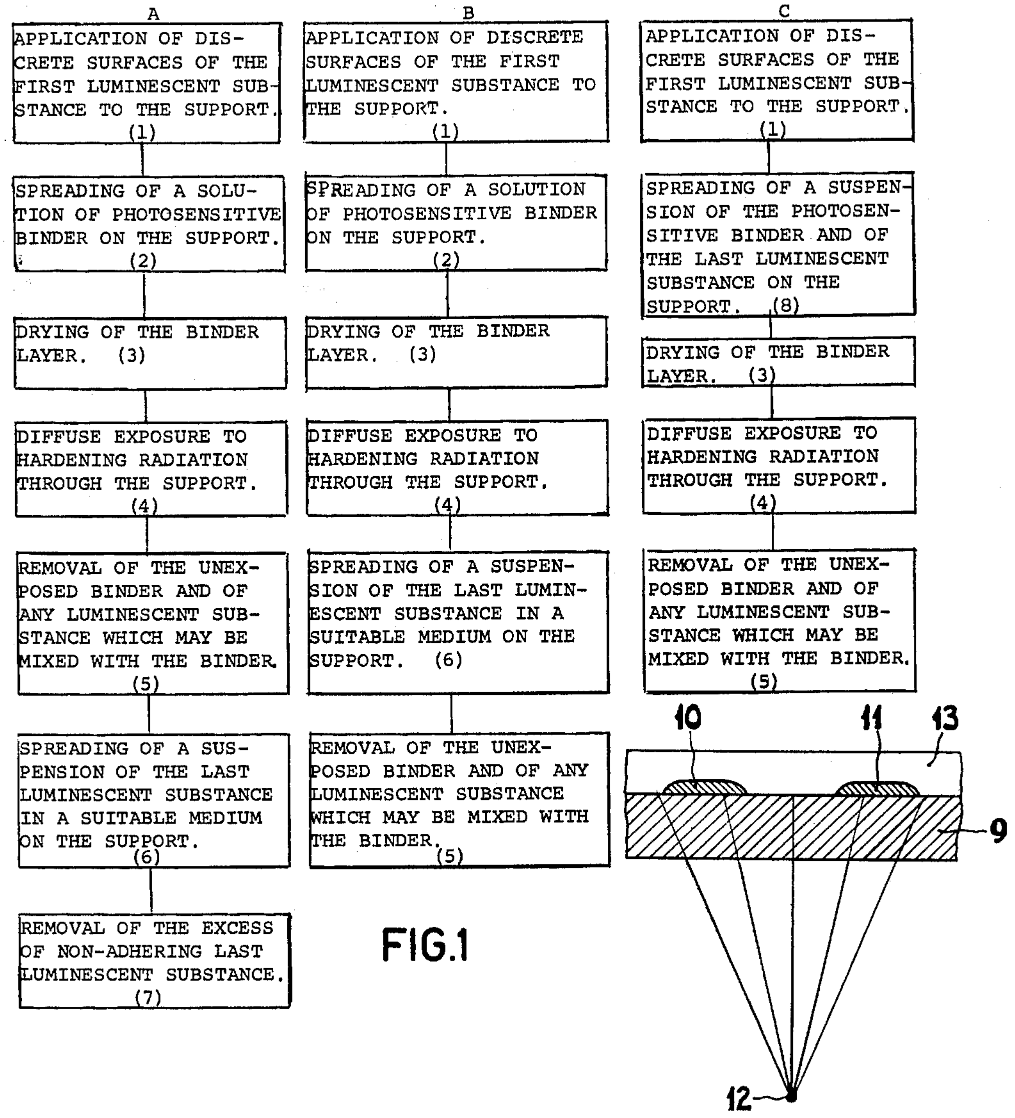
FIGURE 1 shows flow diagrams of a number of embodiments of methods according to the invention, in which the stages of operation described hereinafter are successively carried out.
FIGURE 2 is a cross-sectional view of part of a luminescent screen during one of these stages.

A layer of a photo-sensitive binder in a solution, which generally contains a sensitizer, is applied to the support. When this layer has dried, from the side of the support more remote from the layer the hardening radiation is projected onto the areas to be occupied by the discrete surfaces of the luminescent substance to be applied. In these areas, the binder becomes insoluble in the solvent which is used to dissolve the unexposed areas of the binder (this solvent need not be the same as the solvent in which the binder was first dissolved). If the exposure is not excessively prolonged, the binder remains slightly sticky in the exposed areas. If now, after the exposure, the layer is coated with a suspension of the luminescent material in a suitable medium, this material adheres to the sticky portions only. The unexposed binder is then removed by washing with the solvent for this binder. The non-adhering luminescent substance is thus removed simultaneously. A support results which is covered by discrete surfaces of luminescent materials which are caused to adhere thereto by the binder.

In a modified embodiment of this method, the unexposed binder is immediately removed by washing with the solvent after exposure of the binder layer. A support results having discrete surfaces of sticky binder. If a suspension of luminescent material in a suitable medium has been applied, the luminescent substance adheres to the sticky binder surfaces. Any excess of luminescent material is removed by washing.

The desired distribution of the screen surfaces may be obtained by using a point source of radiation and by interposing between this source and the layer to be exposed a mask having apertures of the same shape and distribution as the desired discrete surfaces of the luminescent substance, for example round apertures if a pattern of circular dots is desired.

To those parts of the supports which after the above-described operations are not coated with luminescent material, a second and, if desired, further luminescent substances may be applied in discrete surfaces by repeating the above-described operations. Thus, a widely used screen for colour television may be manufactured by the application of three different luminescent substances, the screen surfaces being circular dots of equal size which adjoin one another in closest possible stacking and effectively form triangular elements having a luminescent substance emitting a different light at each vertex.

It is a common practice to apply three luminescent substances emitting red, green and blue light respectively, by means of an aqueous solution of polyvinyl alcohol as binder with the use of a bichromate, for example ammonium bichromate, as a sensitizer. A dried layer of this suspension may be hardened by exposure to a radiation having a wavelength of from 360 m$\mu$ to 500 m$\mu$, with the result that the binder is no longer soluble in water or alcohol.

According to the invention, in a method of manufacturing display screens for cathode ray tubes comprising at least two substances applied to a transparent support in discrete surfaces, which substances when excited by electrons luminesce emitting light of different colours and are successively caused to adhere to the support, the last luminescent material is applied by means of a photo-sensitive binder which is spread as a solution on the support already provided with the previously applied discrete surfaces of the other luminescent substances, after which the solution is dried and exposed to hardening radiation. The method is characterized in that the previously applied discrete surfaces of the other luminescent substances poorly transmit the hardening radiation, irradiation is effected through the support, and finally the unexposed binder is removed.

In order to avoid unnecessary complications of the following description of the invention, it will be assumed that only two luminescent substances, to be referred to as first substance and last substance, have to be applied. Without alteration of the characteristic part of the method according to the invention, the first substance may be replaced by two or more substances, which in this event are successively applied by any known method.

The first luminescent substance is applied to the support in known manner so as to form discrete surfaces. The support and the discrete surfaces of the first luminescent substance applied thereto are then coated with a layer of a solution of a photo-sensitive binder and the layer is dried. When the assembly is then exposed through the support, the portions of the coating of binder directly provided on the support are rendered insoluble; the portions disposed on the previously provided discrete surfaces of the first luminescent substance remain soluble, since these surfaces poorly transmit the hardening radiation. Hence, the last luminescent substance to be applied cannot adhere to the discrete surfaces of the first luminescent substance.

The last luminescent substance may be applied in a variety of manners.

As was described hereinbefore, the binder may be exposed for a period of time such that the exposed portions, that is to say, the portions intermediate the previously applied discrete surfaces of the first luminescent substance, are slightly sticky. As was also described hereinbefore, the luminescent substances may then be caused to adhere in the proper areas in two manners, after which the unexposed binder is removed.

Alternatively, the last luminescent substance to be applied may be suspended in the solution of the binder. By the exposure through the support, which may be effected with diffuse radiation, the binder is again hardened only in the areas disposed on the support between the discrete surfaces of the previously applied first luminescent substance. When, after the exposure, the whole is washed with the solvent for the unexposed binder, the non-adhering luminescent material is simultaneously removed.

The above-described methods result in a screen in which the discrete surfaces of the first luminescent substance are completely encircled by the second luminescent substance. Therein lies the large advantage of the invention, for in the operation of the screen manufactured in this manner the contrast of the image observed is greatly improved. An observer can no longer be struck by cathode light.

The invention provides a particular advantage if the composite luminescent layer is coated with a thin metal layer. If, as is the case in one of the known methods of manufacture, certain points of the support are left uncovered, external light falling on the screen may be reflected by the metal layer. This gives rise to a serious reduction in the contrast of the image observed. This is no longer possible in a screen manufactured by a method according to the invention, since the support is completely covered by luminescent substances.

The permeability to the hardening radiation of the last luminescent substance to be applied is not significant, for the hardening radiation is projected through the support and hence directly strikes the binder for this last substance.

In FIGURE 1, the reference numerals denote the following stages of operation:

1—Application of discrete surfaces of the first luminescent substance to the support.
2—Spreading of a solution of photo-sensitive binder on the support.
3—Drying of the binder layer.
4—Diffuse exposure to hardening radiation through the support.
5—Removal of the unexposed binder and of any luminescent substance which may be mixed with the binder.
6—Spreading of a suspension of the last luminescent substance in a suitable medium on the support.
7—Removal of the excess of non-adhering last luminescent substance.
8—Spreading of a suspension of the photo-sensitive binder and of the last luminescent substance on the support.

FIGURE 1 shows three embodiments A, B and C each consisting of a given sequence of the above-described operations. The embodiment C comprises the smallest number of stages and hence is to be preferred.

In FIGURE 2, reference numeral 9 designates part of a support, which may be made of glass, for a luminescent screen. Discrete surfaces 10 and 11 of two different luminescent substances are applied to this support. 10 may be a luminescent material emitting green light and 11 may be a luminescent material emitting a red light. Between these surfaces 10 and 11, the entire support must be covered by a third luminescent substance which may emit blue light. A source of hardening radiation 12 emits a diffuse beam of radiation. The support 9 and the surfaces 10 and 11 are coated with a layer 13 which according to the scheme C of FIGURE 1, comprises the binder and the last luminescent substance to be applied. The radiation emanating from the source 12 can only reach the layer 13 between the discrete surfaces 10 and 11. In the areas between these surfaces, the binder is rendered insoluble by the irradiation, however, it remains soluble and hence readily removable on top of the surfaces 10 and 11. After the exposure, the binder and any non-adhering luminescent substance of the layer 13 are removed from the unexposed areas, that is to say, from the surfaces 10 and 11. The binder and the luminescent material it contains are left, however, on the support between the discrete surfaces 10 and 11 and fill the entire free portion of the surface of the support between the discrete surfaces.

Suitable luminescent substances are, for example, a silver-activated zinc cadmium sulphide for green, a silver-activated zinc sulphide for blue, and another silver-activated zinc cadmium sulphide for red. Of these three substances, the luminescent substance emitting blue light shows the greatest permeability to radiation having a wavelength from 360 m$\mu$ to 500 m$\mu$. Consequently, if this radiation is used to harden the binder, which may be an aqueous solution of polyvinyl alcohol containing a bichromate as a sensitizer, the blue luminescent substance is the last to be applied.

What is claimed is:

1. A method of manufacturing a display screen for a cathode-ray tube comprising the steps of depositing on a transparent support having a luminescent material covering selected areas thereof a hardenable photosensitive binder, exposing the binder through the transparent support to a radiation which hardens the binder but which is adsorbed by the luminescent material to thereby harden the binder only between areas covered by the luminescent material, removing the unexposed and unhardened binder covering the luminescent material, and depositing on the hardened binder a luminescent material which when excited by electrons emits light different in spectral distribution than that of said first mentioned luminescent material.

2. A method of manufacturing a display screen for a cathode-ray tube comprising the steps of depositing a first luminescent substance which emits light of a given spectral distribution when excited by electrons on selected areas of a transparent support, applying a hardenable photosensitive binder over the first luminescent substance and uncovered areas of said support between areas covered by the first luminescent substance, exposing said binder through said transparent support to radiation which hardens said binder but which is absorbed by said first luminescent substance to thereby harden the binder only between the areas of said support covered by the first luminescent substance, removing the unexposed and unhardened binder covering the first luminescent substance, and depositing on the hardened binder a second luminescent substance which emits light of a different spectral distribution when excited by electrons than said first luminescent substance.

3. A method as claimed in claim 2, in which a second luminescent substance is mixed with the photosensitive binder.

4. A method of manufacturing a display screen for a cathode-ray tube for displaying colored images as claimed in claim 2 in which the second luminescent substance is deposited over the entire surface of the support of the display screen between the previously applied selected areas of the said first luminescent substance.

5. A method of manufacturing a cathode-ray tube as claimed in claim 4, which includes the step of coating the composite luminescent layer with a thin metal layer.

References Cited by the Examiner

UNITED STATES PATENTS

| | | | |
|---|---|---|---|
| 2,932,570 | 4/1960 | La Buff et al. | 117—33.5 X |
| 2,959,483 | 11/1960 | Kaplan | 117—33.5 |
| 2,992,107 | 7/1961 | Kaplan et al. | 117—33.5 |
| 2,996,380 | 8/1961 | Evans | 117—33.5 X |

FOREIGN PATENTS

| | | |
|---|---|---|
| 713,908 | 8/1954 | Great Britain. |

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,224,895 December 21, 1965

Johannes Willem Rebel

It is hereby certified that error appears in the above numbered patent requiring correction and that the said Letters Patent should read as corrected below.

Column 4, line 23, for "adsorbed" read -- absorbed --.

Signed and sealed this 25th day of October 1966.

(SEAL)
Attest:

ERNEST W. SWIDER
Attesting Officer

EDWARD J. BRENNER
Commissioner of Patents